United States Patent
Watanabe

(10) Patent No.: US 10,908,855 B1
(45) Date of Patent: Feb. 2, 2021

(54) IMAGE FORMING APPARATUS WITH POWER SAVING MODE

(71) Applicant: TOSHIBA TEC KABUSHIKI KAISHA, Tokyo (JP)

(72) Inventor: Yasuhiko Watanabe, Chigasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/567,491

(22) Filed: Sep. 11, 2019

(51) Int. Cl.
*G06F 3/12* (2006.01)

(52) U.S. Cl.
CPC .......... *G06F 3/1229* (2013.01); *G06F 3/1221* (2013.01); *G06F 3/1259* (2013.01)

(58) Field of Classification Search
CPC ..... G06F 3/1229; G06F 3/1221; G06F 3/1259
See application file for complete search history.

(56) References Cited

U.S. PATENT DOCUMENTS

| | | | | |
|---|---|---|---|---|
| 2011/0010570 A1* | 1/2011 | Hikichi | ................. | G06F 3/1229 713/320 |
| 2012/0155945 A1* | 6/2012 | Ogushi | ................. | G06F 3/1229 400/76 |
| 2013/0163056 A1* | 6/2013 | Hanayama | ......... | H04N 1/00904 358/474 |
| 2013/0335758 A1* | 12/2013 | Torii | ..................... | G06F 3/1285 358/1.9 |
| 2014/0160517 A1* | 6/2014 | Masuyama | ........... | G06F 3/1259 358/1.14 |
| 2015/0341516 A1* | 11/2015 | Hikichi | ............. | H04N 1/00474 358/1.14 |
| 2016/0125280 A1* | 5/2016 | Umezawa | ............. | G06F 3/1229 358/1.14 |

FOREIGN PATENT DOCUMENTS

JP    2007-055129 A    3/2007

* cited by examiner

*Primary Examiner* — Juan M Guillermety
(74) *Attorney, Agent, or Firm* — Foley & Lardner LLP

(57) ABSTRACT

According to one embodiment, an image forming apparatus includes an image forming unit, a fixing unit, a reading unit, and a control unit. The image forming unit forms a visible image on a sheet. The fixing unit executes a fixing process of fixing the visible image on the sheet. The reading unit executes a reading process of reading an image. The control unit starts measurement of time until shift to a power saving mode, and shifts the operation mode to the power saving mode in which power consumption is suppressed when the measured time passes a predetermined set time. The control unit stops the measurement of the time during execution of printing, which is a process involving execution of the fixing process, and continues the measurement of the time during execution of the reading process without execution of the printing.

11 Claims, 6 Drawing Sheets

IMAGE FORMING APPARATUS WITH POWER SAVING MODE

FIELD

Embodiments described herein relate generally to an image forming apparatus and an image forming method.

BACKGROUND

Some image forming apparatuses can operate in a power saving mode in which a fixing device or the like is not warmed in order to realize energy saving. Such an image forming apparatus starts measuring the time to shift to the power saving mode after image formation. Then, the mode of the image forming apparatus is shifted to a power saving mode at a timing when a predetermined time passes. However, an image forming apparatus having an optical character recognition (OCR) function stops measurement of the time to shift to the power saving mode even when executing an OCR process (document reading) in which image formation is not performed. Therefore, the time to shift to the power saving mode may be long, and energy may be wasted.

DETAILED DESCRIPTION

In general, according to one embodiment, an image forming apparatus includes an image former, a fixer, a reader, and a controller. The image former is configured to form a visible image on a sheet. The fixer is configured to fix the visible image on the sheet. The reader is configured to read an image. The controller is configured to start measuring a time in response to determining no execution of a printing process; continue measuring the time during execution of a reading process that includes no execution of the printing process; and shift the image forming apparatus to a power saving mode in which power consumption is suppressed in response to determining that the measured time is greater than a predetermined set time.

Hereinafter, an image forming apparatus and an image forming method according to the embodiments will be described with reference to the drawings.

Figure 1:
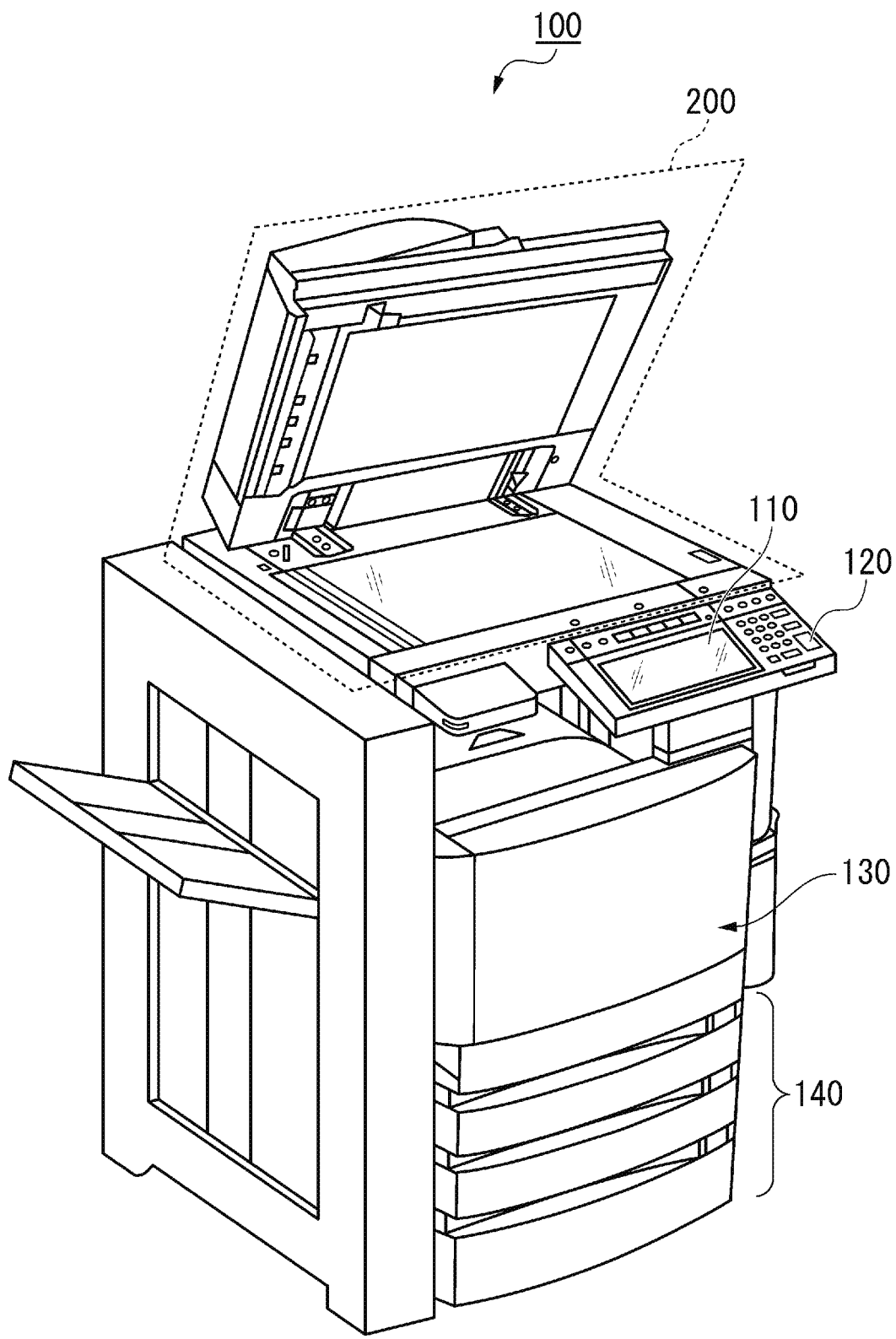
FIG. 1 is an external view showing an example of the overall configuration of an image forming apparatus according to an embodiment.

FIG. 1 is an external view showing an example of the overall configuration of an image forming apparatus 100 according to an embodiment. The image forming apparatus 100 is, for example, a multifunction peripheral. The image forming apparatus 100 includes a display 110, a control panel 120, a printer unit 130, a sheet accommodating unit 140, and an image reading unit 200. The image forming apparatus 100 forms an image on a sheet using a developer such as toner. The sheet is, for example, paper or label paper. The sheet may be any material as long as the image forming apparatus 100 can form an image on its surface.

The display 110 is an image display device such as a liquid crystal display or an organic electro luminescence (EL) display. The display 110 displays various types of information regarding the image forming apparatus 100.

The control panel 120 has a plurality of buttons. The control panel 120 receives an operation from a user. The control panel 120 outputs a signal corresponding to the operation performed by the user to a control unit of the image forming apparatus 100. The display 110 and the control panel 120 may be configured as an integral touch panel.

The printer unit 130 forms an image on a sheet based on image information generated by the image reading unit 200 or image information received via a communication path. The printer unit 130 includes an image forming unit 160, a fixing unit 170, and the like, which will be described later. The printer unit 130 forms an image using a developer such as toner, for example. The sheet on which the image is formed may be a sheet accommodated in a sheet accommodating unit 140 or may be a manually inserted sheet.

The sheet accommodating unit 140 accommodates a sheet used for image formation in the printer unit 130.

The image reading unit 200 reads image information to be read as brightness and darkness of light. The image reading unit 200 records the read image information. The recorded image information may be transmitted to another information processing apparatus via a network. The recorded image information may form an image on a sheet by the printer unit 130.

Figure 2:
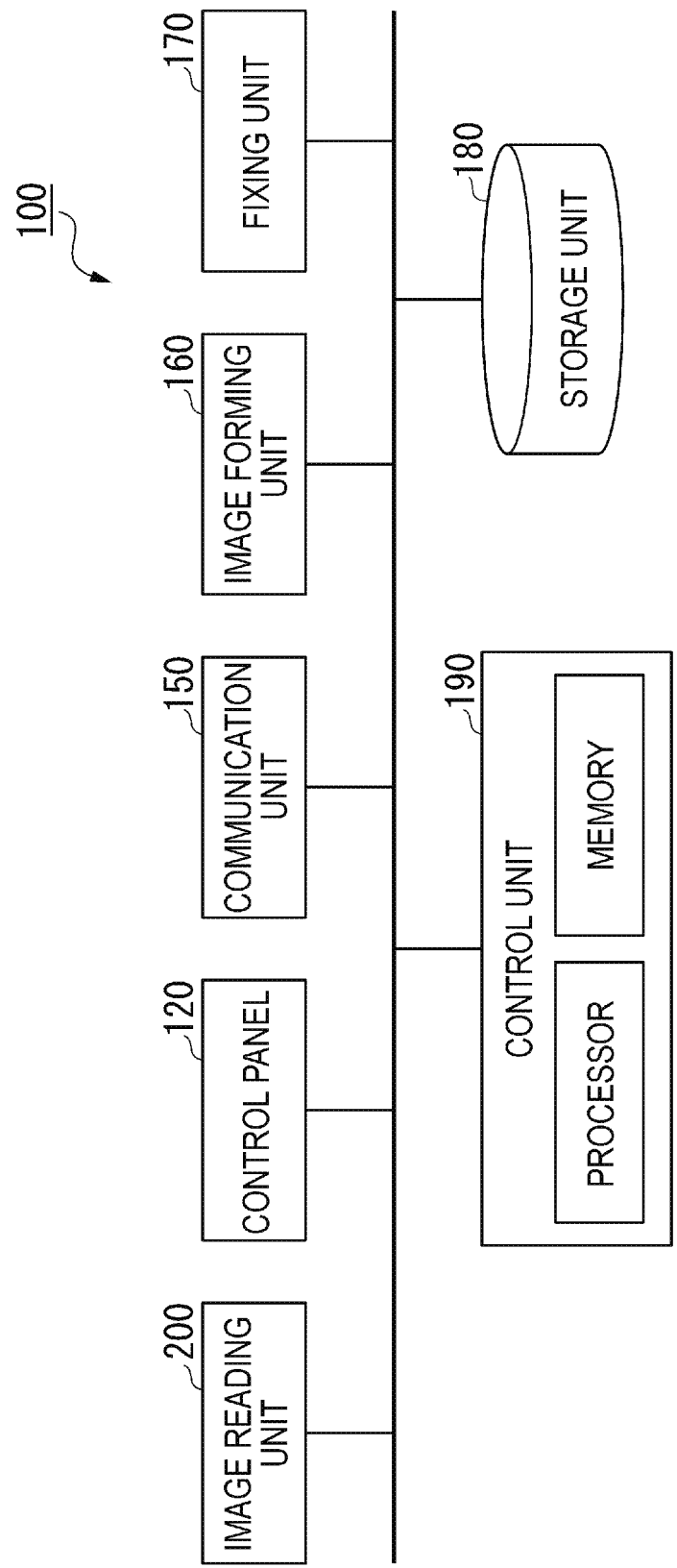
FIG. 2 is a view showing an example of a functional configuration of the image forming apparatus.

FIG. 2 is a view showing an example of a functional configuration of the image forming apparatus 100 according to the embodiment. The image forming apparatus 100 includes an image reading unit (or an image reader) 200, a control panel 120, a communication unit 150, an image forming unit (or an image former) 160, a fixing unit (or a fixer) 170, a storage unit 180, and a control unit (or a controller) 190.

The communication unit 150 includes a communication interface for connecting the own device to an external device. The communication unit 150 communicates with an external device via wireless or wired communication, and outputs the received information to the control unit 190. The communication unit 150 receives, for example, a print job. The print job may include image information.

The control unit 190 is configured using a processor such as a CPU or a memory. The control unit 190 operates by a processor executing a program. The control unit 190 controls the operation of each functional unit included in the image forming apparatus 100. The control unit 190 controls, for example, the power supplied to the fixing unit 170. The power supplied to the fixing unit 170 is, for example, power supplied to a halogen lamp. The control unit 190 executes, for example, an optical character recognition (OCR) process. The control unit 190 controls, for example, the operation of the reading control unit 24.

The image forming unit 160 and the fixing unit 170 operate according to the control of the control unit 190.

Figure 3:
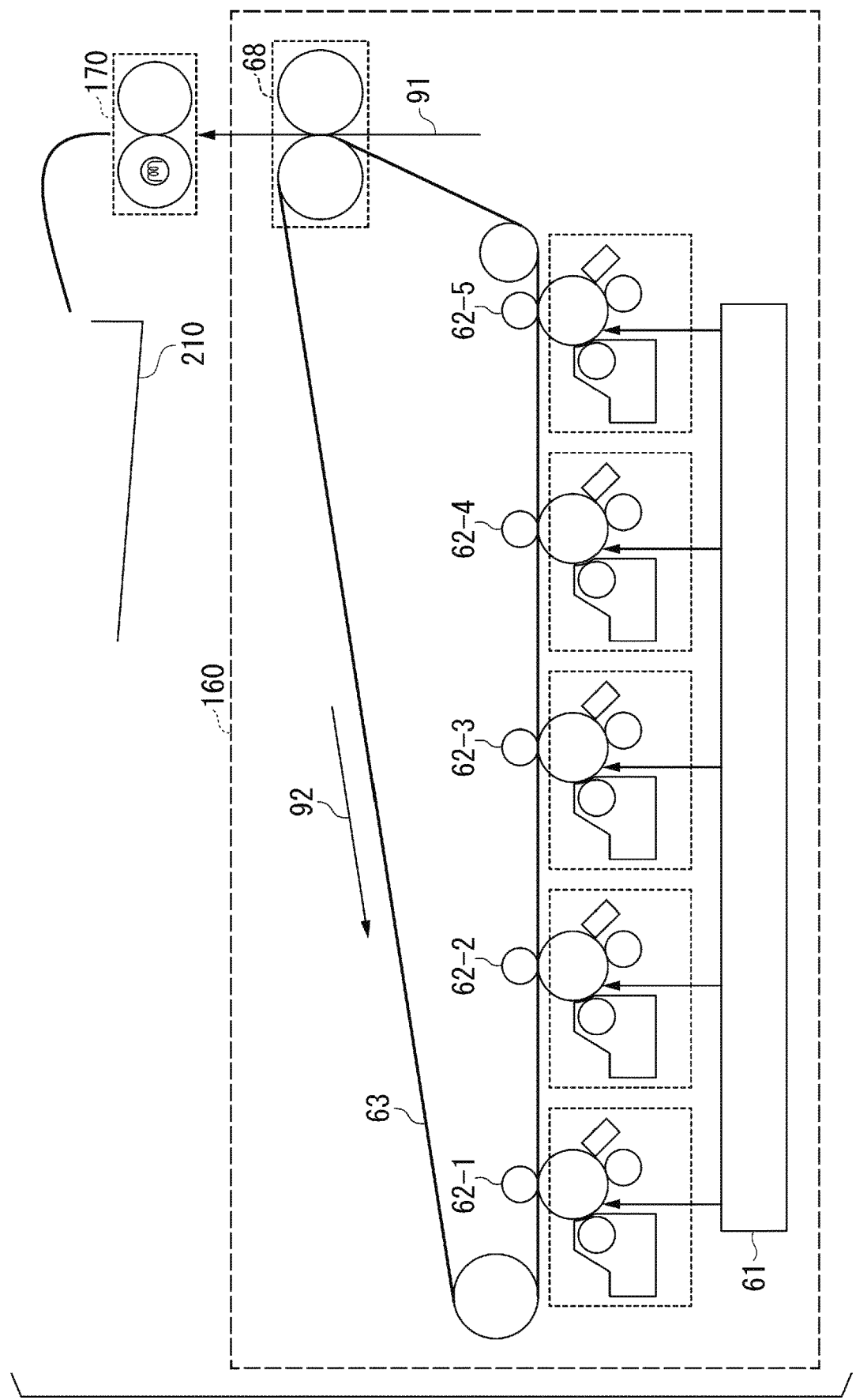
FIG. 3 is a view showing an example of the configuration of an image forming unit and a fixing unit.

FIG. 3 is a view showing an example of the configuration of the image forming unit 160 and the fixing unit 170 according to the embodiment. The image forming unit 160 operates, for example, as follows. An exposure unit 61 of the image forming unit 160 forms an electrostatic latent image on a photosensitive drum based on image information to be an object of image formation. A developing device of the image forming unit 160 forms a visible image (toner image) by attaching a developer to the electrostatic latent image. Primary transfer units 62-1 to 62-5 of the image forming unit 160 transfer the formed visible image to an image carrier (intermediate transfer member) 63. The rotation direction of the image carrier is a direction indicated by an arrow 92. Therefore, the visible image formed on the image carrier is conveyed to a secondary transfer unit 68 by rotation of the image carrier. The secondary transfer unit 68 of the image forming unit 160 transfers the visible image formed on the image carrier onto a sheet conveyed in a direction of an arrow 91.

The fixing unit 170 fixes the transferred visible image on the sheet. The fixing unit 170 includes, for example, a heat roller having a heat source therein, a pressure roller for pressing a sheet against the heat roller, and the like. Such a fixing unit 170 fixes the visible image on the sheet, for example, by the following operation. Power is supplied to a halogen lamp and the halogen lamp emits heat. The heat roller is heated by the heat emitted from the halogen lamp. The sheet is pressed against the heat roller by the pressure roller. The visible image is fixed on the sheet by applying pressure by pressing and heat of the heat roller to the visible image. The sheet on which the visible image is fixed by the fixing unit 170 is conveyed to a paper discharge unit 210 and discharged from the inside of the image forming apparatus 100 to the outside.

The storage unit 180 is configured using a storage device such as a magnetic hard disk drive or a semiconductor storage device. The storage unit 180 stores various values used in the process of the control unit 190.

Figure 4:
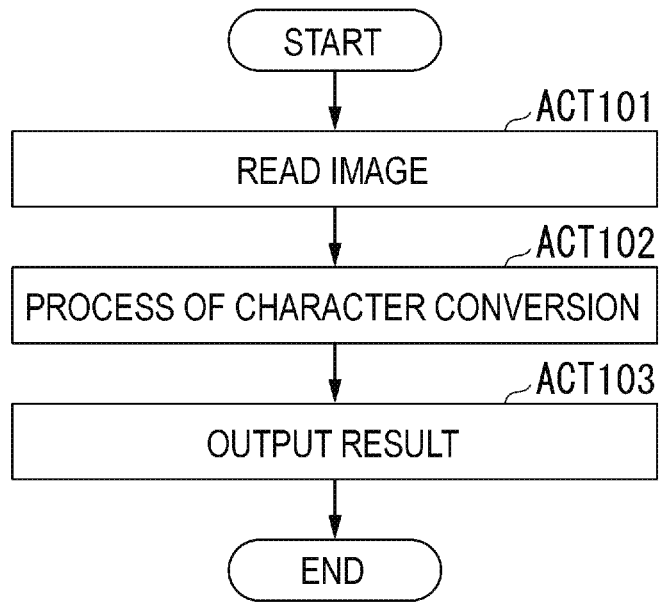
FIG. 4 is a flowchart showing an example of a flow of an OCR process.

FIG. 4 is a flowchart showing an example of a flow of an OCR process in the embodiment.

The image reading unit 200 acquires image information to be read (ACT 101). Next, the control unit 190 executes a character conversion process (ACT 102). The character conversion process is a process of detecting a character string in an object to be read based on image information. Specifically, the following process is executed in the character conversion process. First, a character area is determined based on the acquired image information. Next, an image of each character in the determined area is extracted. Next, the character indicated by the extracted image is determined. Next, the determination result is output as character string information (text information) for all the extracted characters. After ACT 102, the detection result (text information) is output to the display 110 (ACT 103). The detection result does not necessarily have to be output to the display 110, and the detection result may be transmitted to a predetermined external device via the communication unit 150, or the detection result maybe stored in the storage unit 180.

Figure 5:
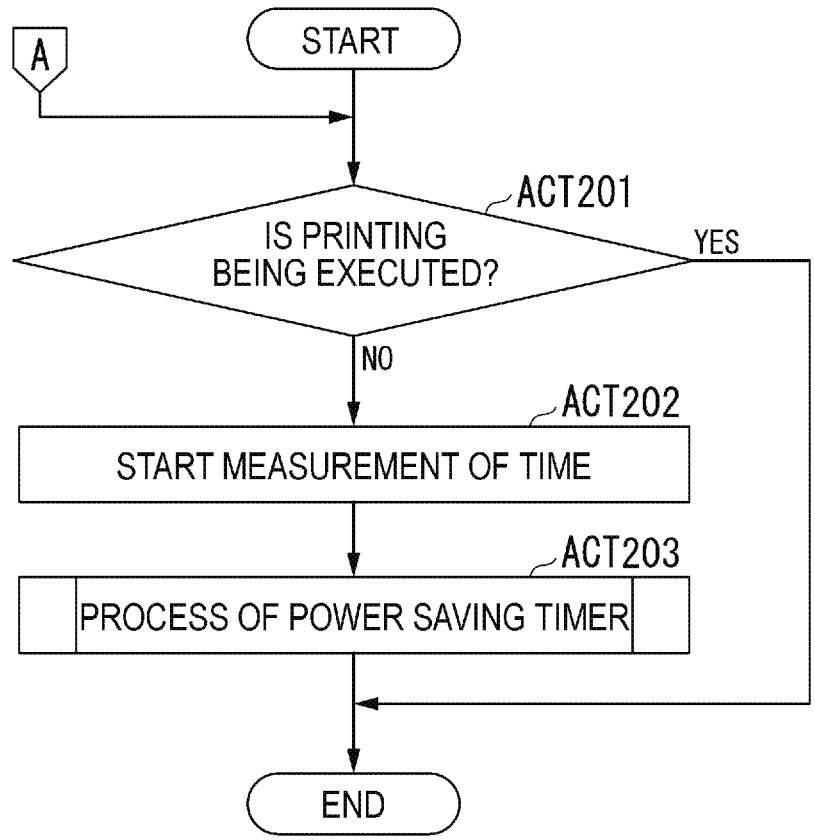
FIG. 5 is a flowchart showing an example of a flow of a process executed by the image forming apparatus.

FIG. 5 is a flowchart showing an example of a flow of a process executed by the image forming apparatus 100 according to the embodiment.

At a predetermined timing, the control unit 190 determines whether or not the printing is being executed (ACT 201). The printing is a process that involves execution of a fixing process for fixing a visible image on a sheet. The printing is, for example, a process of forming an image on a sheet by the image forming unit 160 and the fixing unit 170.

When the printing is being executed (ACT 201: YES), the process ends. On the other hand, when the printing is not being executed (ACT 201: NO), the control unit 190 starts measurement of an elapsed time until the mode is shifted to the power saving mode (ACT 202). Hereinafter, the elapsed time until the mode is shifted to the power saving mode is referred to as the power saving mode shift time. The power saving mode is an operation mode in which power consumption is suppressed. More specifically, for example, the power saving mode is an operation mode operated in a state where the power supplied to the fixing unit 170 is less than a predetermined power (hereinafter, referred to as "reference power"). The power saving mode may be, for example, an operation mode in which power is not supplied to the fixing unit 170. The reference power is the power required for the fixing process. The fixing process is a process in which the fixing unit 170 fixes a visible image on a sheet. The temperature of the heat roller of the fixing unit 170 to which the reference power is supplied is raised to a temperature that allows the visible image to be fixed on the sheet. After ACT 202, the control unit 190 executes a power saving timer process (ACT 203).

Figure 6:
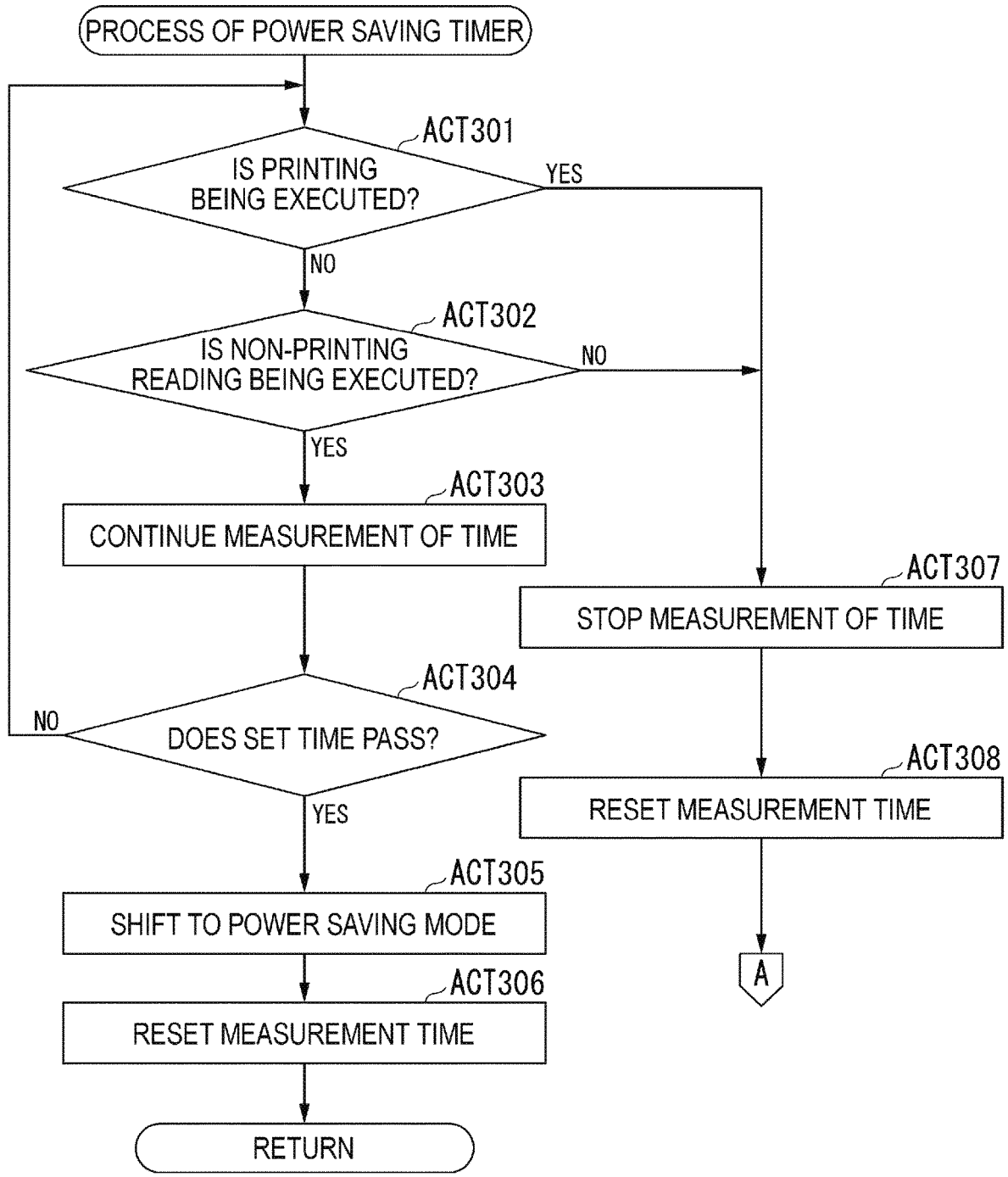
FIG. 6 is a flowchart showing an example of a flow of a power saving timer process.

FIG. 6 is a flowchart showing an example of the flow of the power saving timer process in the embodiment. The control unit 190 determines whether or not the printing is being executed (ACT 301). When the printing is not being executed (ACT 301: NO), the control unit 190 determines whether or not the reading process without the execution of the printing is being executed (ACT 302). Hereinafter, the reading process without the execution of the printing is referred to as non-printing reading. The reading process is a process in which an image is read from the image reading unit 200. The non-printing reading is, for example, a process itself in which the image reading unit 200 reads an image. The non-printing reading is, for example, an OCR process. The non-printing reading is, for example, a read image saving process of saving image data of a read original document as a file.

In ACT 302, when the non-printing reading is being executed (ACT 302: YES), the control unit 190 continues the measurement of the power saving mode shift time (ACT 303). Next, the control unit 190 determines whether or not the power saving mode shift time elapses a predetermined set time set in advance (ACT 304). When the power saving mode shift time elapses the set time (ACT 304: YES), the control unit 190 shifts the operation mode of the image forming apparatus 100 to the power saving mode (ACT 305). Next, the control unit 190 resets the power saving mode shift time (ACT 306).

On the other hand, when the printing is being executed in ACT 301 (ACT 301: YES), the control unit 190 stops the measurement of the power saving mode shift time (ACT 307). Next, the control unit 190 resets the power saving mode shift time (ACT 308). After ACT 308, the process returns to ACT 201.

When the control panel 120 is operated, the processes of ACT 301 and ACT 302 are determined as NO.

The image forming apparatus 100 configured in this manner includes the control unit 190 that continues the measurement of the power saving mode shift time even during execution of the reading process without the execution of the printing such as the OCR process. Therefore, it is possible to suppress an increase in the time to shift to the power saving mode by execution of the reading process without the execution of the printing, and it is possible to eliminate the waste of energy.

Modification Example

The power saving timer process is not necessarily limited to the flow shown in FIG. 6. When the set time elapses during the execution of the non-printing reading, a process of shifting the mode to a power saving mode may be executed after the non-printing reading is completed. Hereinafter, the specific process flow in this case is described in FIG. 7.

Figure 7:
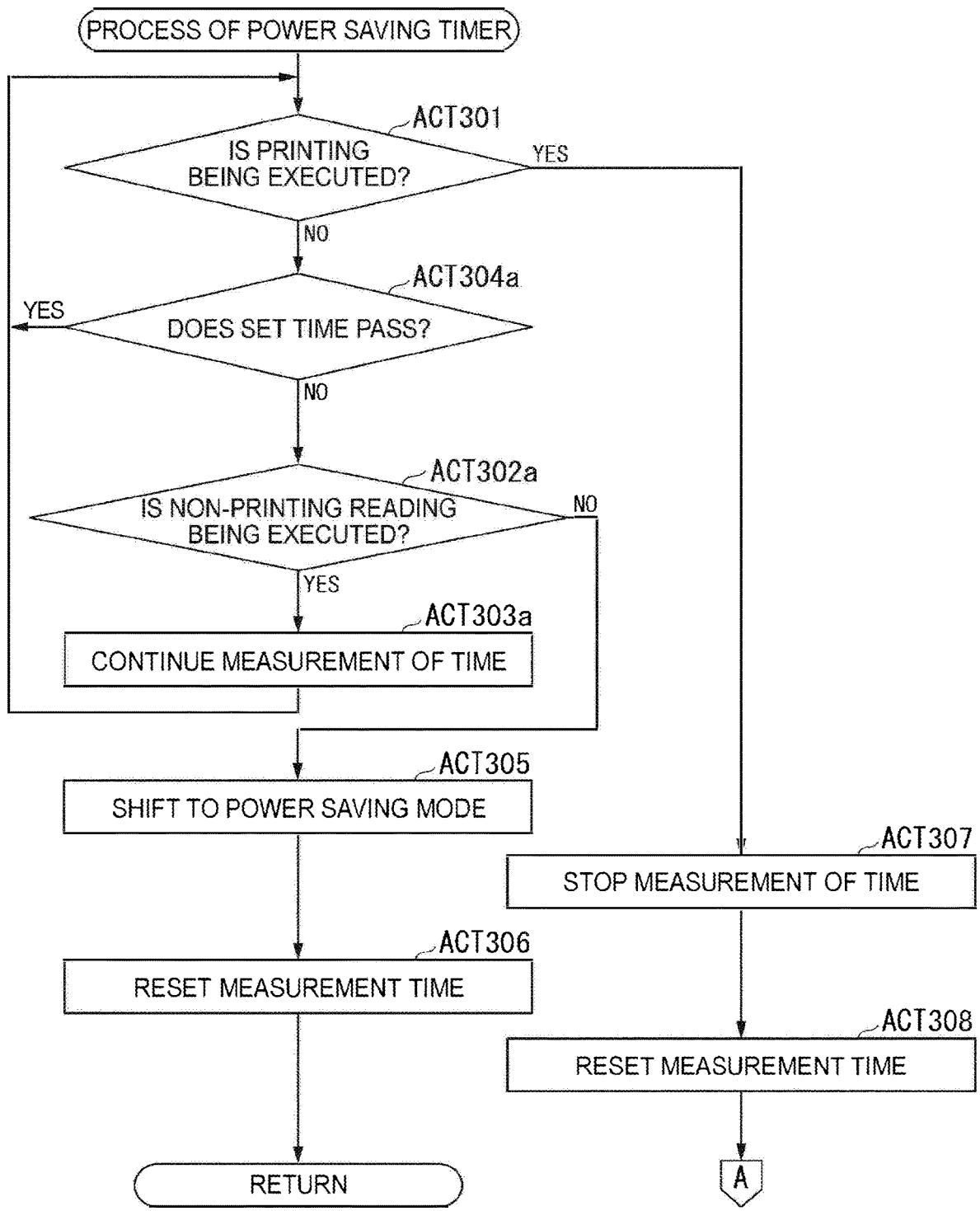
FIG. 7 is a flowchart showing an example of the flow of the power saving timer process according to a modification example.

FIG. 7 is a flowchart showing an example of a flow of a power saving timer process in a modification example. Hereinafter, the same process as in FIG. 6 will be omitted by using the same reference numerals.

The process of ACT 301 is executed in the same manner as in FIG. 6. When the printing is not executed (ACT 301: NO), the control unit 190 determines whether or not the power saving mode shift time elapses the set time (ACT 304a). When the power saving mode shift time does not elapse the set time (ACT 304a: NO), the process returns to ACT 301. On the other hand, when the power saving mode shift time elapses the set time (ACT 304a: YES), the control unit 190 determines whether or not the non-printing reading is being executed (ACT 302a). When the non-printing reading is being executed (ACT 302a: YES), the control unit 190 continues the measurement of the power saving mode shift time (ACT 303a). Next, the process returns to ACT 301. On the other hand, when the non-printing reading is not being executed in ACT 302a (ACT 302a: NO), the process of ACT 305 is executed. After the execution of the process of ACT 305, the process of ACT 306 is executed. On the other hand, in ACT 301, when the printing is being executed (ACT 301: YES), the process of ACT 307 is executed. After the process of ACT 307, the same process as in FIG. 6 is executed.

In the fixing unit 170 of the embodiment, a method of fixing a visible image on a sheet by heating through a film-like member may be applied.

The image reading unit 200 is an example of the reading unit. In addition, the condition shown in FIG. 5 that the printing is not being executed is an example of a predetermined condition regarding the shift of the operation mode of the own device. The control panel 120 is an example of an input unit.

According to at least one embodiment described above, by providing the control unit 190, the waste of energy can be eliminated.

All or part of various functions of the image forming apparatus 100 may be realized using hardware such as an application specific integrated circuit (ASIC), a programmable logic device (PLD), or a field programmable gate array (FPGA). The program may be recorded on a computer readable recording medium. For example, the compute readable recording medium may be a portable medium such as a flexible disk, a magneto-optical disk, a ROM, or a CD-ROM, or a storage device such as a hard disk built in a computer system. The program may be transmitted via an electric communication line.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
an image former configured to form a visible image on a sheet;
a fixer configured to fix the visible image on the sheet;
a reader configured to read an image; and
a controller configured to:
start measuring a time in response to determining no execution of a printing process;
continue measuring the time during execution of a reading process; and
shift the image forming apparatus to a power saving mode in which power consumption is suppressed in response to determining that the measured time is greater than a predetermined set time.

2. The apparatus according to claim 1, wherein
the controller is further configured to not shift the image forming apparatus to the power saving mode until the reading process is completed.

3. The apparatus according to claim 1, wherein
the reading process is an optical character recognition (OCR) process.

4. The apparatus according to claim 1, wherein
the reading process is a read image saving process.

5. The apparatus according to claim 1, wherein
the printing process includes forming the visible image on the sheet by at least the image former and the fixer.

6. The apparatus according to claim 1, wherein
a predetermined power less than a power required for the fixer to fix the visible image on the sheet is supplied to the fixer in the power saving mode.

7. The apparatus according to claim 1, wherein
no power is supplied to the fixer in the power saving mode.

8. An image forming method comprising:
determining whether to execute a printing process that includes fix a visible image on a sheet;
determining whether to execute a reading process that includes reading an image;
starting measuring a time in response to determining no execution of the printing process;
continuing measuring the time during execution of the reading process; and
shifting an image forming apparatus to a power saving mode in which power consumption is suppressed in response to determining that the measured time is greater than a predetermined set time.

9. The method of claim 8, further comprising:
not shifting the image forming apparatus to the power saving mode until the reading process is completed.

10. The method of claim 8, further comprising:
stopping measuring the time in response to determining execution of the printing process.

11. The method of claim 8, wherein
the reading process is an optical character recognition (OCR) process.

* * * * *